(12) United States Patent
Borchtchoukova et al.

(10) Patent No.: US 10,522,844 B2
(45) Date of Patent: Dec. 31, 2019

(54) NICKEL-BASED CATALYST FOR FUEL CELL (71) Applicant: GENCELL LTD., Petah Tikva (IL)

(72) Inventors: Nino Borchtchoukova, Modiin (IL); Vyacheslav Feldman, Rishon LeZiyon (IL); Gennadi Finkelshtain, Modiin (IL); Slavcho Kirilov Rakovsky, Sofia (BG); Margarita Valentinova Gabrovska, Sofia (BG); Dimitrinka Aleksieva Nikolova, Sofia (BG); Lyubima Pancheva Bilyarska, Sofia (BG)

(73) Assignee: Gencell Ltd., Petah Tikva (IL)

( * ) Notice: Subject to any disclaimer, the term of this patent is extended or adjusted under 35 U.S.C. 154(b) by 510 days.

(21) Appl. No.: 15/521,367

(22) PCT Filed: Mar. 12, 2015

(86) PCT No.: PCT/US2015/020221
§ 371 (c)(1),
(2) Date: Apr. 24, 2017

(87) PCT Pub. No.: WO2015/142619
PCT Pub. Date: Sep. 24, 2015

(65) Prior Publication Data
US 2017/0263942 A1 Sep. 14, 2017

Related U.S. Application Data (60) Provisional application No. 61/954,704, filed on Mar. 18, 2014.

(51) Int. Cl.
H01M 4/92 (2006.01)
H01M 4/88 (2006.01)
H01M 4/90 (2006.01)

(52) U.S. Cl.
CPC ......... *H01M 4/921* (2013.01); *H01M 4/8803* (2013.01); *H01M 4/8842* (2013.01); (Continued)

(58) Field of Classification Search
None
See application file for complete search history.

(56) References Cited

U.S. PATENT DOCUMENTS 5,494,538 A 2/1996 Kirillov et al.
2005/0064274 A1* 3/2005 Reichman ............. H01M 8/083
429/421
(Continued)

FOREIGN PATENT DOCUMENTS

JP 2007-087924 A 4/2007

OTHER PUBLICATIONS

Allagui, Anis et al., International Journal of Hydrogen Energy, Nov. 8, 2013, vol. 39, No. 1, pp. 41-48.
(Continued)

*Primary Examiner* — Christopher P Domone
(74) *Attorney, Agent, or Firm* — Abel Schillinger, LLP (57) ABSTRACT The invention relates to a catalyst which is suitable for use in an anode of a fuel cell. The catalyst comprises (i) nickel metal and (ii) at least one metal selected from transition metals and may optionally also comprise (iii) at least one metal selected from alkaline earth metals. Metals (i), (ii) and, if present, (iii) are supported on (iv) a finely divided electrically conductive carrier. The weight ratio (i):((ii)+(iii)) is at least 3:1.

20 Claims, 3 Drawing Sheets (52) U.S. Cl.
CPC ....... *H01M 4/9041* (2013.01); *H01M 4/9083* (2013.01); *H01M 4/926* (2013.01)

(56) References Cited

U.S. PATENT DOCUMENTS

| | | | |
|---|---|---|---|
| 2005/0120827 A1* | 6/2005 | Fetcenko | B01J 23/755 75/370 |
| 2007/0031722 A1* | 2/2007 | Adzic | H01M 4/8657 429/424 |
| 2007/0160899 A1* | 7/2007 | Atanassova | H01M 4/8807 429/413 |
| 2009/0004521 A1 | 1/2009 | Morita et al. | |
| 2010/0143821 A1* | 6/2010 | McGrath | H01M 4/8652 429/483 |
| 2010/0239921 A1 | 9/2010 | Fan | |
| 2012/0015281 A1 | 1/2012 | Sakamoto et al. | |
| 2013/0295485 A1 | 7/2013 | Gottesfeld et al. | |

OTHER PUBLICATIONS

Allagui, Anis et al., Electrochimica Acta 2013, vol. 110, pp. 253-259, Jul. 13, 2013.

\* cited by examiner

NICKEL-BASED CATALYST FOR FUEL CELL

CROSS-REFERENCE TO RELATED APPLICATIONS

The present application claims priority of U.S. Provisional Patent Application No. 61/954,704, filed Mar. 18, 2014, the entire disclosure of which is expressly incorporated by reference herein.

BACKGROUND OF THE INVENTION

1. Field of the Invention

The present invention relates to a nickel-based catalyst for the anode a fuel cell and in particular, an alkaline fuel cell. The invention also relates to processes for making the catalyst and an anode comprising the catalyst.

2. Discussion of Background Information

A fuel cell (FC) is one of the oldest electrochemical devices that generate electricity, heat and water by direct electrochemical reaction of a hydrogen-rich fuel with oxygen without any harmful emissions and therefore in an extremely environmentally friendly way. The direct generation of electricity allows FCs to be highly energy efficient. FCs have been deployed as an alternative power generation technique for the future in both mobile and stationary applications, ranging from toys to scale power stations and plants, from vehicles to mobile chargers, and from household power to battlefield power. FCs are generally classified according to the nature of the electrolyte: alkaline fuel cells (AFC), proton-exchange membrane fuel cells (PEMFCs), solid oxide fuel cells (SOFCs), phosphoric acid fuel cells (PACFs) and molten carbonate fuel cells (MCFCs), each with its own characteristic, each type requiring particular materials and fuel. However, they all comprise the same essential components, namely anode support, anode catalyst layer, electrolyte, cathode support, cathode catalyst layer, bipolar plates/interconnects and sometimes gaskets for sealing/preventing leakage of gases between anode and cathode. Each fuel cell type also has its own operational characteristics, offering advantages to particular applications. This makes fuel cells a very versatile technology.

AFCs show promise as environmentally friendly electrochemical power sources for distributed cogeneration for building, and transportation applications. The traditional AFCs operate on compressed hydrogen and oxygen and generally use a solution of potassium hydroxide in water as their electrolyte. AFCs use a liquid KOH electrolyte solution because it is the most conductive of all alkaline hydroxides, and also an effective heat transfer and water management medium. In these cells, hydroxyl ions (OH) migrate from the cathode to the anode. The hydrogen fuel is supplied continuously to the anode compartment and an oxidant (often oxygen from air) is fed continuously to the cathode compartment. At the anode, hydrogen gas reacts with the OH ions to produce water and release electrons. Electrons generated at the anode supply electrical power to an external circuit, then return to the cathode. There the electrons react with oxygen and water to produce more $OH^-$ ions that diffuse into the electrolyte. AFCs operate at efficiencies up to 70 percent and create little pollution. Because they produce potable water in addition to electricity, they have been a logical choice for spacecraft. The electrical voltage between the anode and the cathode is in the range 0.5-0.9 V, depending on the load and the electrochemical reactions.

For the low and intermediate temperature FCs, platinum and platinum group metals, either as alone (Pt/C) or in combination of two or more thereof, as well as their corresponding alloys have been preferred as ideal materials suitable for use as electrocatalysts for both the hydrogen oxidation reaction (HOR) and the oxygen reduction reaction (ORR) due to the high capacity and performance in any media. However, the cost of Pt and the limited world supply are significant barriers to the widespread use of these types of fuel cells. Accordingly, a large-scale production and application of noble metal catalysts in practical FCs is limited due to the scanty world resources and high cost.

Attempts have been made to replace platinum partially or completely by transition metal compositions as anodes for AFCs that would retain performance in fuel cell electrodes without being too expensive. Apart from lower cost, another advantage of transition metal catalysts is their low susceptibility to poisoning.

Palladium is the most attractive replacement for platinum because these two metals have very similar properties (same group of the Periodic Table, same fcc crystal structure, similar atomic size, etc.). The cost of palladium is lower than that of platinum, so it could be a good substitute for platinum as the catalyst in fuel cells. Palladium is also of interest because it is at least fifty times more abundant on the earth than platinum. For these reasons, palladium has been tested in fuel cells as a platinum co-catalyst and/or as a platinum-free anode catalyst in alkaline media. It has been reported that addition of metals like Co, Ru, Mn and especially Ni significantly promotes the activity and stability of Pd/C electrocatalysts.

A variety of inexpensive non-noble metal materials (e.g., Fe, Co, and Ni) for fuel cell components has already been employed as well. The catalytic activity of nickel as the anode catalyst is about three orders of magnitude lower than that of platinum. That performance deficit can be remedied to some extent with a much higher electrode loading of the less expensive catalyst, by enlarging the active area using finely divided particles and otherwise optimizing the electrode structure. With regard to this, nickel-containing composites such as nickel boride ($Ni_2B$) have been widely used as anode materials, because nickel metal is highly conductive and corrosion resistant to potassium hydroxide and demonstrates unique catalytic activity for the hydrogen oxidation reaction (HOR). The Raney-nickel catalyst, which is among the most active non-noble metals for the HOR, has been the target of interest, especially in AFCs. However, electrodes with Raney-nickel catalysts without support have been reported to suffer from insufficient conductivity. Therefore, in order to enhance the electrical conductivity in the catalyst layer and to increase the catalytic activity, Raney-nickel catalysts were alloyed with carbon material. Raney-nickel hydrogen electrodes containing nickel alone as a transition metal component show relatively large polarizations, a time-dependent behavior and high electrolyte diffusion resistance due to low pore volume and small pore size. These problems have been circumvented by doping the starting Ni—Al alloy with a small percentage of transition metals such as Ti, Cr, Fe and Mo prior to extraction by KOH. Different methods of preparations of the active metal both without and with metal dopants (Ti, Mo, Fe, Cr, Cu) have been proposed and reported in the literature aiming to overcome the mentioned difficulties.

Metal hydride (MH) alloys and intermetallic compounds such as $MmNi_{3.5}Co_{0.7}Al_{0.7}Mn_{0.1}$ and $MlNi_{3.65}Co_{0.85}Al_{0.3}Mn_{0.3}$ (Ml: La-rich mischmetal) also have been tested for use as anode catalysts in AFCs. They are characterized by good electrochemical properties, mechanical and chemical stabilities in alkaline electrolyte.

According to scientific articles and patents published in recent years, the nickel-containing catalysts continue to be applied as the most promising materials for preparation of the anode electrodes in the $H_2$—$O_2$ AFCs. In some AFCs the anode catalyst material consists of 65% of nickel and 35% of aluminum with 1% of carbon black and 7% of PTFE as bonding agents (see, e.g., JP 2007-087924 A, the entire disclosure of which is incorporated herein). In other AFCs an electrode is obtained by applying a catalyst carrying Ni, Co, and Fe on carbon fine particles to the surface of nickel foam. PTFE is used as a binder (see, e.g., US 2009/0004521 A1, the entire disclosure of which is incorporated herein). In yet another AFC, the anode catalyst layer comprises nickel and the cathode catalyst layer comprises silver. An also present $CO_2$ inhibitor is in the form of a polymer-bound $CO_2$ adsorbent. In particular, the catalyst layer of the anode electrode promotes $CO_2$ desorption (see, e.g., US 2010/0239921 A1, the entire disclosure of which is incorporated herein).

In view of the foregoing, it would be advantageous to be able to replace the platinum metal used for the production of an anode electrocatalyst with a non-platinum metal such as a transition d-metal without significantly decreasing the electrochemical activity of the catalyst.

SUMMARY OF THE INVENTION

The present invention provides a catalyst which is suitable for use in an anode of a fuel cell and in particular, an alkaline fuel cell. The catalyst comprises (i) nickel metal and (ii) at least one metal selected from transition metals. The catalyst may optionally also comprise (iii) at least one metal selected from alkaline earth metals. Metals (i), (ii) and, if present, (iii) are supported on (iv) a finely divided electrically conductive carrier. The weight ratio (i):((ii)+(iii)) is at least 3:1.

In one aspect of the catalyst, metal (ii) may comprise at least one of Pd, Cr, Co or Fe and in particular, at least Pd.

In another aspect, metal (iii) may be absent, or metal (iii) may be present and may comprise at least one of Ca and Mg and in particular, at least Mg.

In yet another aspect, the catalyst of the present invention may be substantially free of Pt and in particular, may be substantially free of any of Pt, Rh, Ru, Ag, and Au (and preferably also free of Ir and Os). In another aspect, the catalyst may (also) be substantially free of Al and preferably substantially free of all other main group metals (with the exception of alkaline earth metals).

In a still further aspect, the weight ratio (i):((ii)+(iii)) may be at least 4:1, for example, at least 4.5:1, or at least 5:1.

In another aspect of the catalyst of the present invention, the support (iv) may comprise (activated) carbon and/or may have a specific surface area of at least 50 $m^2/g$ and/or at least 50% of the particles thereof may have a particle size of not higher than 30 µm.

In another aspect, the catalyst may comprise, based on the total weight of components (i) through (iv), at least 5% by weight of (i) and/or not more than 20% by weight of (i) and/or the catalyst may comprise at least 1% by weight of (ii) and/or not more than 4% by weight of (ii) and/or the catalyst may comprise at least 0.2% by weight of (iii) and/or not more than 1% by weight of (iii) and/or the catalyst may comprise at least 8% by weight of (i), (ii) and, optionally, (iii) and/or not more than 30% by weight of (i), (ii) and, optionally, (iii).

In another aspect of the catalyst of the present invention, metals (i) and (ii) and, optionally, (iii) may have been provided on the support (iv) by co-precipitation of metal hydroxides and/or (optionally hydrated) oxides from a solution of corresponding metal compounds (e.g. metal salts) with an alkaline agent in the presence of support (iv) and subsequent reduction of the filtered and dried resultant particles, or may have been provided by contacting a solution of the corresponding metal compounds (e.g. salts) with a reducing agent under alkaline conditions and in the presence of (iv).

The present invention also provides an anode that is suitable for use in a fuel cell and in particular, an alkaline fuel cell and comprises the nickel-based catalyst of the present invention as set forth above (including the various aspects thereof).

In one aspect, the anode may have a surface area of from 0.5 $cm^2$ to 200 $cm^2$.

The present invention also provides a fuel cell and in particular, an alkaline fuel cell that comprises the anode of the present invention as set forth above (including the various aspects thereof).

The present invention further provides a first process for making a catalyst that is suitable for use in an anode for a fuel cell and in particular, an alkaline fuel cell (for example and in particular, a catalyst as set forth above (including the various aspects thereof)). The first process comprises contacting a (preferably aqueous or aqueous/alcoholic) solution of (i) a nickel(II) compound, (ii) a compound of at least one transition metal and, optionally, (iii) a compound of at least one alkaline earth metal with a stoichiometric excess of reducing agent under basic conditions in the presence of (iv) an electrically conductive carrier (preferably having a specific surface area of at least 50 $m^2/g$). The weight ratio nickel:(transition metal+alkaline earth metal) is at least 3:1.

In one aspect of the process, the reducing agent may be selected from (a) hydrogen gas, (b) metal hydrides (including borohydrides), (c) hydrazine, (d) alkali and alkaline earth metal thiosulfates, sulfites, phosphites, hydrophosphites, and (e) combinations of two or more thereof. For example, the reducing agent may comprise hydrazine.

In another aspect of the first process, an at least 3-fold stoichiometric excess of reducing agent (such as, e.g., hydrazine) may be employed.

In yet another aspect, the basic conditions may comprise a pH of at least 9. For example, the basic conditions may comprise a pH of from 10 to 12.

In a still further aspect, the process may be carried out at a temperature of at least 50° C.

In yet another aspect, the aqueous solution may comprise from 0.08 to 0.5 moles of Ni(II) compound.

The present invention further provides a second process for making a catalyst that is suitable for use in an anode for a fuel cell and in particular, an alkaline fuel cell (for example and in particular, a catalyst of the present invention as set forth above (including the various aspects thereof)). The second process comprises contacting a (preferably aqueous or aqueous/alcoholic) solution of (i) a nickel(II) compound, (ii) a compound of at least one transition metal and, optionally, (iii) a compound of at least one alkaline earth metal with an alkaline agent in the presence of (iv) an electrically conductive carrier (preferably having a specific surface area of at least 50 $m^2/g$) to co-precipitate hydroxides and/or (optionally hydrated) oxides of Ni, the at least one transition metal and, optionally, the at least one alkaline earth metal on (iv), filtering and drying the resultant particles, followed by contacting the dried particles with reducing agent. The weight ratio nickel:(transition metal+alkaline earth metal) is at least 3:1.

In one aspect of the second process, the reducing agent may comprise hydrogen gas.

In another aspect of both the first and second processes of the present invention, (i) may comprise nickel(II) chloride and/or nickel(II) nitrate and/or (ii) may comprise a chloride and/or a nitrate of the at least one transition metal such as, e.g., Pd(II) chloride and/or (iii), if employed, may comprise a chloride and/or a nitrate of an alkaline earth metal such as Mg and/or Ca.

In yet another aspect, the first process or second process is carried out in the substantial absence of platinum and compounds thereof.

The present invention further provides a catalyst that is suitable for use in an anode of an (alkaline) fuel cell and is obtainable by any of the processes set forth above (including the various aspects thereof), as well as an anode that comprises this catalyst and a (preferably alkaline) fuel cell that comprises the anode.

The present invention further provides a process for making an anode that is suitable for use in a fuel cell. This process comprises mixing the catalyst of the instant invention as set forth above (including the various aspects thereof) with a binder and forming the resultant mixture into a ribbon (e.g. by rolling), followed by combining the ribbon (usually under pressure) with a current collector (e.g., by pressing) to form the anode material (which may be cut into pieces of desired dimensions for the anode). The binder may, for example, comprise polytetrafluoroethylene. The current collector may, for example, comprise a metal grid such as, e.g., a nickel grid.

The present invention further provides a fuel cell (preferably an alkaline fuel cell) comprising a cathode, an anode and an electrolyte. The fuel cell comprises the anode set forth above, including the various aspects thereof.

The present invention further provides an electrical device that is in contact with a fuel cell according to the present invention as set forth above, as well as a method of powering an electrical device, which method comprises establishing electrical contact between the device and a fuel cell of the present invention as set forth above.

BRIEF DESCRIPTION OF THE DRAWINGS

The present invention is further described in the detailed description which follows, in reference to the accompanying drawings by way of non-limiting examples of exemplary embodiments of the present invention. In the drawings.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

As used herein, the singular forms "a," "an," and "the" include the plural reference unless the context clearly dictates otherwise. For example, reference to "a transition material" would also mean that mixtures of two or more transition metals can be present unless specifically excluded.

Except where otherwise indicated, all numbers expressing quantities of ingredients, reaction conditions, etc. used in the instant specification and appended claims are to be understood as being modified in all instances by the term "about." Accordingly, unless indicated to the contrary, the numerical parameters set forth in the present specification and the appended claims are approximations that may vary depending upon the desired properties sought to be obtained by the present invention. At the very least, each numerical parameter should be construed in light of the number of significant digits and ordinary rounding conventions.

Additionally, the disclosure of numerical ranges within this specification is considered to be a disclosure of all numerical values and ranges within that range. For example, if a range is from 1 to 50, it is deemed to include, for example, 1, 7, 34, 46.1, 23.7, or any other value or range within the range.

The catalyst of the present invention comprises metallic nickel and one or more (e.g., 1, 2 or 3) transition metals in metallic form, including in the form of alloys comprising nickel and the one or more transition metals (and optionally, one or more alkaline earth metals). Examples of suitable transition metals include Y, Ti, Zr, Hf, V, Nb, Ta, Cr, Mo, W, Mn, Fe, Co, Cu, Zn, Cd, Pd, Pt, Ag, Au, Ru, Rh, Ir, Os. Preferred transition metals are Cr, Co, Fe and Pd, with Pd being particularly preferred. In other words, the one or more transition metals in the catalyst of the present invention preferably include Pd, either alone or in combination with one or more other (preferably non-noble) transition metals (preferably selected from Cr, Co, Fe). It also is preferred for the catalyst to be substantially free of Pt. It is even more preferred for the catalyst to be substantially free of any of Pt, Rh, Ru, Ag, Au. For example, the catalyst may be substantially free of any of Pt, Rh, Ru, Ag, Au, Os, Ir. The catalyst of the present invention is preferably also substantially free of any metal that is different from a transition metal and an alkaline earth metal. It is also preferred for the catalyst to be substantially free of Al. The term "substantially free" as used herein and in the appended claims is intended to mean that not more than 0.1%, e.g., not more than 0.05%, not more than 0.01%, or not more than 0.001% by weight, based on the total weight of the metals and the electrically conductive carrier present in the catalyst of the present invention, of a corresponding metal is present in the catalyst. It also is preferred for the catalyst of the present invention to essentially consist of, or to consist of components (i), (ii) and (iv) or of components (i), (ii), (iii) and (iv).

If also one or more alkaline earth metals (Mg, Ca, Sr and/or Ba) are present in the catalyst of the present invention, the alkaline earth metal is preferably Mg and/or Ca, more preferably Mg. The weight ratio Ni:alkaline earth metal(s) is preferably at least 10:1, e.g., at least 20:1, at least 25:1, or at least 30:1.

The weight ratio Ni:(transition metal(s)+alkaline earth metal(s)) in the catalyst of the present invention is at least 3:1, for example, at least 3.5:1, at least 4:1, at least 4.5:1, or at least 5:1, although higher weight ratios such as, e.g., at least 5.5:1, at least 6:1 or even higher are possible as well. For example, especially if the transition metal(s) do not include significant amounts of Pd and the catalyst is substantially free of Pt, Rh, Ru, Ag, Au, Os, Ir the weight ratio may be at least 10:1, e.g., at least 20:1, or at least 30:1.

Based on the total weight of nickel, transition metal(s), alkaline earth metal(s) and electrically conductive carrier, the catalyst of the present invention preferably comprises at least 5%, e.g., at least 8%, at least 10%, at least 12%, at least 15%, or at least 17% by weight of nickel. Especially if the transition metal(s) include Pd, the concentration of nickel will usually not exceed 20% by weight, although higher concentrations (usually not higher than 30% by weight) are possible.

Based on the total weight of nickel, transition metal(s), alkaline earth metal(s) and electrically conductive carrier, the catalyst of the present invention preferably comprises at least 1%, e.g., at least 1.5%, at least 2%, or at least 2.5% by weight of the one or more transition metals (e.g., of Pd). The concentration of the one or more transition metals will usually be not higher than 4%, e.g., not higher than 3.5% by weight, or not higher than 3% by weight although higher concentrations are possible.

Based on the total weight of nickel, transition metal(s), alkaline earth metal(s) and electrically conductive carrier, the catalyst of the present invention preferably comprises, if present at all, at least 0.2%, e.g., at least 0.3%, at least 0.4%, or at least 0.5% by weight of the one or more alkaline earth metals. The concentration of the one or more alkaline earth metals will usually not be higher than 1%, e.g., not higher than 0.7% by weight, although higher concentrations are possible.

Based on the total weight of nickel, transition metal(s), alkaline earth metal(s) (if present) and electrically conductive carrier, the catalyst of the present invention preferably comprises at least 8%, e.g., at least 10%, at least 12%, or at least 15% by weight of all metals that are present (preferably these metals consist of nickel, transition metal(s) and, optionally, alkaline earth metal(s), i.e., substantially no other metals are present in the catalyst of the present invention). The total concentration of nickel, transition metal(s) and, optionally, alkaline earth metal(s) in the catalyst of the present invention will usually be not higher than 30%, e.g., not higher than 25% by, or not higher than 20% by weight, although higher total concentrations are possible. The size of the metal particles on the support and in particular, the size of the nickel particles, will usually be not higher than 30 nm, e.g., not higher than 20 nm, not higher than 10 nm, not higher than 5 nm, or not higher than 2 nm (applies to at least 90%, preferably at least 95% of all particles).

The finely divided electrically conductive carrier employed as support of the catalyst of the present invention preferably comprises or consists of (activated) carbon. The carrier preferably has a specific surface area (measured according to the BET method with nitrogen gas) of at least 50 m$^2$/g, e.g., at least 100 m$^2$/g, at least 200 m$^2$/g, at least 300 m$^2$/g, at least 400 m$^2$/g, at least 500 m$^2$/g, at least 700 m$^2$/g, or at least at least 900 m$^2$/g. There is no particular upper limit for the specific surface area, but apparently with increasing specific surface area of the support the handling of the support will become more difficult (e.g., due to its increasingly pyrophoric properties). For practical reasons the specific surface area will usually be not higher than 2,500 m$^2$/g.

The carrier will usually have a particle size (applying to at least 90% of all particles) which is not smaller than about 0.5 μm, e.g., not smaller than about 1 μm, not smaller than about 5 μm, or not smaller than about 10 μm, and not higher than about 100 μm, e.g., not higher than about 80 μm, or not higher than about 70 μm. It is preferred that at least 50% of the carrier (e.g., carbon) particles have a particle size of not higher than 30 μm, e.g., not higher than 25 μm, or not higher than 20 μm. Carbon supports which are suitable for the purposes of the present invention are available from many commercial sources. Non-limiting examples of suitable commercially available products are sold under the tradenames Vulcan XC-72, Vulcan P90, Black Pearls 2000, Black Pearls 450, Black Pearls 570, Regal 400, Regal 330 (all available from Cabot, USA), Picatif SC 10 (available from Pica USA Inc, Columbus, Ohio), Norit GSX, Norit SX Plus, Norit DLC Supra (available from Norit, Netherlands), carbon AKC, HSAG-300CAT (available from Lonza, Switzerland) and Sibunit (available from the Institute of Technical Carbon, Omsk, Russia; see also U.S. Pat. No. 4,978,649, the entire disclosure of which is incorporated by reference herein).

The catalyst of the present invention can be prepared by many different methods which are know to those of skill in the art. For example, in one method nickel, one or more transition metals and, optionally, one or more alkaline earth metals are co-precipitated on the support in the form of the corresponding metal hydroxides and/or (optionally hydrated) oxides by adding an alkaline agent to a (preferably aqueous or aqueous/alcoholic) solution of the corresponding metal compounds (usually metal salts of an inorganic acid such as the nitrates and halides and in particular, the chlorides of the corresponding metals, although salts of organic acids, complex salts and other compounds wherein the metals are present in an oxidized state may be used as well) in the presence of the support. The concentration of the metal salts (e.g. the nickel salt) in the solution will often be at least 0.08 molar but usually not higher than 0.5 molar. Non-limiting examples of alkaline agents for use in this process include hydroxides, carbonates and bicarbonates of alkali and alkaline earth metals (e.g., Li, Na, K, Cs, Mg, Ca and Ba), Al, Zn and ammonium such as, e.g., sodium hydroxide, sodium carbonate, sodium bicarbonate and potassium carbonate, as well as ammonia and amines. Sodium carbonate and sodium bicarbonate are currently preferred alkaline agents. The alkaline agents can be employed individually or in any combinations thereof. Following the co-precipitation (which will usually be carried out at room temperature, although higher and lower temperatures can be used as well) the carrier particles will usually be filtered, washed and dried and thereafter subjected to a reduction with a suitable reducing agent. A preferred reducing agent is hydrogen gas. In this case the reduction is usually carried out at elevated temperature (e.g., in the temperature range of from about 100° C. to about 450° C.).

According another process for making the catalyst of the present invention, a (preferably aqueous or aqueous/alcoholic) solution of the corresponding metal compounds (usually metal salts of an inorganic acid such as the nitrates and halides and in particular, the chlorides of the corresponding metals, although salts of organic acids, complex salts and other compounds wherein the metals are present in an oxidized state may be used as well) is contacted with a stoichiometric excess of a reducing agent under alkaline conditions and in the presence of the support. The concentration of the metal salts (e.g. a nickel salt) in the solution will often be at least 0.08 molar but usually not higher than 0.5 molar. The reducing agent may be in the form of a gas (e.g., hydrogen) or may be employed in the form of a (preferably aqueous or aqueous/alcoholic) solution. In the latter case, non-limiting examples of reducing agents include hydride and borohydride compounds such as, e.g., $NaBH_4$, $KBH_4$, $LiBH_4$, $Al(BH_4)_3$, $Zn(BH_4)_2$, $NH_4BH_4$, $(CH_3)_3NHBH_3$, $NaCNBH_3$, $LiAlH_4$, $NaAlH_4$, $CaH_2$, $LiH$, $NaH$, and $KH$, hydrazine and derivatives thereof, formaldehyde, alkali and alkaline earth metal thiosulfates, sulfites, phosphates, hypophosphites and any combinations thereof. A currently preferred reducing agent is hydrazine (preferably employed in the form of an aqueous solution). The reducing agent will usually be employed as a solution in an aqueous solvent, preferably water or water/alcohol. The amount of reducing agent will usually be at least slightly higher (e.g., at least about 10% higher) than the stoichiometric amount required for a complete reduction of the metal species present. Usually, the stoichiometric excess is at least 3-fold.

For example, if hydrazine is employed as the reducing agent, the hydrazine will be usually added as a solution in an aqueous solvent, preferably water. The pH of the solution will usually be at least about 9 and not higher than about 12. This pH depends to some extent on the pH of the aqueous solution of the Ni(II) and d-transition metal compounds, and will usually be such that following the complete addition of the reducing agent, the pH of the resulting mixture is not lower than about 1, but usually not higher than about 12.

In order to adjust the pH of the solution of the reducing agent, the solution will usually contain an alkaline agent, such as NaOH, KOH, $NaHCO_3$ or $Na_2CO_3$. The concentration of the reducing agent in the solution will usually be at least about 0.9 molar, but usually not higher than about 2 molar.

The reducing agent is added to the metal salt containing solution preferably in a continuous fashion and at a rate which provides a desired small particle size. The rate of addition should also be sufficient to reduce already formed nickel and transition metal particles which have been oxidized on their surface by the oxygen present in the solution. This rate depends on the concentrations and the pH values of the solutions of the Ni(II) and transition metal compounds and the reducing agent, the types of reducing agent and Ni(II) and transition metal compounds employed, and the temperature at which the process is carried out. A suitable rate of addition can be determined by routine experimentation. The particle size of the formed nickel particles preferably is not higher than about 30 nm, e.g., not higher than about 20 nm, not higher than about 10 nm, not higher than about 5 nm, or not higher than about 2 nm.

The above process can be carried out over a wide temperature range. Best results are usually obtained within a temperature range of from about 20° C. to about 95° C.

Following the reduction process, the electrically conductive carrier (e.g., carbon) with the metallic nickel and metallic transition metal(s) such as Pd (and optionally metallic alkaline earth metal(s)) deposited thereon will usually be filtered, washed with water and dried. The drying operation is carried out preferably at a temperature of about 90° C. to about 120° C. and/or for a period of about 12 hours to about 24 hours, mainly depending on the drying temperatures employed.

An anode for a fuel cell can be made from the nickel containing catalyst of the present invention in a conventional manner well known to those skilled in the art. Merely by way of example, a material comprising the catalyst of the present invention and a binder (e.g., PTFE) may be rolled into a ribbon. The ribbon may be pressed onto a current collector such as a metal (e.g. nickel) grid.

The material comprising the Ni-based catalyst of the present invention may be employed as the anode of a fuel cell and in particular, an alkaline fuel cell. The cathode of the fuel cell may be any cathode that can be used in combination with an (alkaline) fuel cell. Examples thereof are well known to those skilled in the art.

The structure of a typical fuel cell according to the present invention comprises an anode which in its operative state is in contact with a fuel (e.g. hydrogen gas) on one side, and is in contact with a liquid electrolyte (e.g., an aqueous alkali metal hydroxide, preferably aqueous KOH) on its other side, and a cathode which also is in contact with the liquid electrolyte on one side thereof. The other side of the cathode is in contact with an oxidant, preferably oxygen, air or any other oxygen containing gas.

The fuel cell of the present invention can be used to supply electrical energy to a virtually unlimited number of electric and electronic devices.

To sum up, the present invention provides:

1. A catalyst for an anode of a fuel cell, which catalyst comprises, in metallic form, (i) nickel, (ii) at least one transition metal and, optionally, (iii) at least one alkaline earth metal, supported on (iv) a finely divided electrically conductive carrier, the weight ratio (i):((ii)+(iii)) being at least 3:1.

2. The catalyst of item 1, wherein (ii) comprises at least one of Pd, Cr, Co, Fe.

3. The catalyst of item 2, wherein (ii) comprises at least Pd.

4. The catalyst of any one of items 1 to 3, wherein (iii) is present and comprises at least one of Ca and Mg.

5. The catalyst of items 4, wherein (iii) comprises at least Mg.

6. The catalyst of any one of items 1 to 3, wherein (iii) is absent.

7. The catalyst of any one of items 1 to 6, wherein the catalyst is substantially free of Pt.

8. The catalyst of any one of items 1 to 7, wherein the catalyst is substantially free of Pt, Rh, Ru, Ag, Au.

9. The catalyst of any one of items 1 to 8, wherein the weight ratio (i):((ii)+(iii)) is at least 4:1

10. The catalyst of any one of items 1 to 9, wherein (iv) comprises activated carbon.

11. The catalyst of any one of items 1 to 10, wherein (iv) has a specific surface area of at least 50 $m^2/g$.

12. The catalyst of any one of items 1 to 11, wherein at least 50% of the particles of (iv) have a size of not more than 30 µm.

13. The catalyst of any one of items 1 to 12, wherein the particles of (i), (ii) and, optionally, (iii) supported on (iv) have a size of not more than 30 nm.

14. The catalyst of any one of items 1 to 13, wherein the catalyst comprises at least 5% by weight of (i), based on a total weight of (i) to (iv).

15. The catalyst of item 14, wherein the catalyst comprises not more than 20% by weight of (i).
16. The catalyst of any one of items 1 to 15, wherein the catalyst comprises at least 1% by weight of (ii), based on the total weight of (i) to (iv).
17. The catalyst of item 16, wherein the catalyst comprises not more than 4% by weight of (ii).
18. The catalyst of any one of items 1 to 17, wherein the catalyst comprises at least 0.2% by weight of (iii), based on a total weight of (i) to (iv).
19. The catalyst of item 18, wherein (iii) is present in a concentration of not more than 1% by weight.
20. The catalyst of any one of items 1 to 19, wherein the catalyst comprises a total of at least 8% by weight of (i), (ii) and, optionally, (iii), based on the total weight of (i) to (iv).
21. The catalyst of any one of items 1 to 20, wherein (i) and (ii) and, optionally, (iii) have been provided on (iv) by co-precipitation of metal hydroxides and/or oxides from a solution of corresponding metal compounds with an alkaline agent in the presence of (iv) and subsequent reduction of filtered and dried particles.
22. The catalyst of any one of items 1 to 19, wherein (i) and (ii) and, optionally, (iii) have been provided on (iv) by contacting a solution of corresponding metal compounds with a reducing agent under alkaline conditions and in presence of (iv).
23. An anode for a fuel cell which comprises the catalyst of any one of items 1 to 22.
24. The anode of item 23, wherein the anode has a surface area of from 0.5 cm² to 200 cm².
25. A fuel cell which comprises the anode of any one of items 23 and 24.
26. A process for making a catalyst for an anode of a fuel cell, which process comprises contacting a solution of (i) a nickel(II) compound, (ii) a compound of at least one transition metal and, optionally, (iii) a compound of at least one alkaline earth metal with a stoichiometric excess of reducing agent under basic conditions in the presence of (iv) an electrically conductive carrier having a specific surface area of at least 50 m²/g, the weight ratio nickel:(transition metal+alkaline earth metal) being at least 3:1.
27. The process of item 26, wherein the reducing agent is selected from hydrogen gas, metal hydrides, hydrazine, alkali and alkaline earth metal thiosulfates, sulfites, phosphites, hydrophosphites, and combinations of two or more thereof.
28. The process of any one of items 26 and 27, wherein the reducing agent comprises hydrazine.
29. The process of any one of items 26 to 28, wherein an at least 3-fold stoichiometric excess of reducing agent is employed.
30. The process of any one of items 26 to 29, wherein the basic conditions comprise a pH of at least 9.
31. The process of any one of items 26 to 30, wherein the basic conditions comprise a pH of from 10 to 12.
32. The process of any one of items 26 to 31, wherein the process is carried out at a temperature of at least 50° C.
33. The process of any one of items 26 to 32, wherein the aqueous solution comprises from 0.08 to 0.5 moles of Ni(II) compound.
34. A process for making a catalyst for an anode of a fuel cell, which process comprises contacting a solution of (i) a nickel(II) compound, (ii) a compound of at least one transition metal and, optionally, (iii) a compound of at least one alkaline earth metal with an alkaline agent in presence of (iv) an electrically conductive carrier having a specific surface area of at least 50 m²/g to co-precipitate hydroxides and/or oxides of Ni, the at least one transition metal and, optionally, the at least one alkaline earth metal on (iv), filtering and drying resultant particles, followed by contacting the dried particles with reducing agent, the weight ratio nickel:(transition metal+alkaline earth metal) being at least 3:1.
35. The process of item 34, wherein the reducing agent comprises hydrogen gas.
36. The process of any one of items 26 to 35, wherein (i) comprises at least one of nickel(II) chloride and nickel(II) nitrate.
37. The process of any one of items 26 to 36, wherein (ii) comprises at least one of a chloride and a nitrate of the at least one transition metal.
38. The process of any one of items 26 to 37, wherein (ii) comprises at least Pd(II) chloride.
39. The process of any one of items 26 to 38, wherein (iii) comprises at least one of a chloride and a nitrate of the at least one alkaline earth metal.
40. The process of any one of items 26 to 39, wherein the process is carried out in the substantial absence of platinum and compounds thereof.
41. A catalyst for an anode of a fuel cell which is obtainable or obtained by the process of any one of items 26 to 40.
42. An anode for a fuel cell, which anode comprises the catalyst of item 41.
43. A fuel cell which comprises the anode of item 42.
44. An electrical device which is in electrical contact with the fuel cell of any one of items 25 and 43.
45. A method of powering an electrical device, which method comprises establishing electrical contact between the device and the fuel cell of any one of items 25 and 43.

EXAMPLES

All chemicals used for preparations described herein were of pro analysis quality.

Example 1

1.1. Synthesis of Coprecipitated Ni—Pd—Mg Sample (17.05% Ni-2.5% Pd-0.45% Mg/80.0% C)

Solution A 46.6 g Ni(NO$_3$)$_2$.6H$_2$O and 2.64 g Mg(NO$_3$)$_2$.6H$_2$O were placed in a glass beaker and dissolved in 150 ml of deionized water under vigorous stirring without heating until full dissolution (pH=5.5).

Solution B 2.3 g PdCl$_2$ was placed in a glass beaker and dissolved in 100 ml HNO$_3$ (1/1) under stirring for complete dissolution of PdCl$_2$, followed by addition of 100 ml of deionized water (pH=1.0).

Solutions A and B were mixed, diluted to 1000 ml with deionized water and stirred for 2 h (pH=1.0).

Solution C 100 g of anhydrous Na$_2$CO$_3$ used as a precipitant was placed in a glass beaker and dissolved in 1000 ml of deionized water (to afford a concentration of 100 g/l) under vigorous stirring and heating at 80-90° C. without boiling until full dissolution.

A total of 44.0 g carbon (specific surface about 2000 m²/g; 90% of the carbon particles not larger than about 30 μm) was placed in a 3-liter reactor equipped with a stirrer, thermocouple and pH electrode. 900 ml of deionized water was added and the resultant mixture was stirred for 20 min. The temperature of the obtained suspension was increased to 60° C. Thereafter, the mixed Ni—Pd—Mg solution (Solutions A+B) was subjected to co-precipitation with $Na_2CO_3$ solution (Solution C) at pH 9.5-10 and a temperature of 60° C. under vigorous stirring. The solutions were introduced dropwise and simultaneously using two dosimeters, namely Ni—Pd—Mg solution with a flow rate of about 10 ml/min and $Na_2CO_3$ solution with a flow rate of about 15 ml/min. After ageing for 60 min under the conditions described above, the resultant slurry was filtered and the filter cake was thoroughly washed with deionized water until the pH of the filtrate was about 6.0 and $NO_3^-$ and $CF$ ions could no longer be detected. The precipitate was dried in a vacuum oven at 100° C. for 12-15 h, affording 55.0 g of powder containing by weight 17.05% Ni. 2.5% Pd, 0.45% Mg and 80% carbon.

1.2. Dry Reduction of Coprecipitated Ni—Pd—Mg Sample with 99.9% Hydrogen 25 g of the powder prepared as described above was divided into three crucibles and reduced separately in a tube furnace. The powder was purged under an Ar flow (flow rate about 1.8 cc/sec) for 30 min. Thereafter, the temperature was increased to 450° C. at a rate of 3° C./min under a $H_2$ flow (flow rate about 1.8 cc/sec). The reduction proceeded at 450° C. for 240 min. After completion of the reduction, the reduced sample was cooled under $H_2$ flow. Once the temperature had decreased to 160° C. the $H_2$ flow was changed to an Ar flow and the cooling continued to 40° C. The reduced sample was taken out of the furnace and placed in a desiccator.

1.3 Preparation and Testing of Anode Made with Reduced Sample 25 g of the above catalyst was mixed with polytetrafluorethylene (PTFE) at a weight ratio catalyst/PTFE of 80/20. Mixing was carried out at room temperature with a blender for about 5 min.

The resultant mixture of catalyst and PTFE was placed into a rolling device to make a ribbon. The produced catalyst ribbon was placed on a nickel grid and pressed thereon, yielding the anode material. The anode was tested by a Volt-Ampere Curve (VAC) on a half-cell test bench (HCTB).

A Volt-Ampere Curve (VAC) obtained in a galvanostatic measurement gives the best preliminary estimation of the electrode's performance. The galvanostatic experiment simulates the real conditions and loads on the cathode in a fuel cell. For the maximum modeling of the real conditions in ECG the electrolyte (KOH) should circulate and be heated to 70° C. This can be accomplished by testing a series of electrodes in the HCTB or in a specially designed half-cell configuration.

The HCTB provides a constant KOH electrolyte circulation that is thermostatically controlled at 70° C. The anode is tested in a half-cell equipped with counter and reference electrodes. The anode is gas-liquid electrode, i.e., on one side it is covered by liquid electrolyte and on the other side it is exposed to a hydrogen gas atmosphere. The half-cell has a gas chamber on the gas side of a working electrode. The HCTB also provides a hydrogen flow at the desired pressure and flow rate, and the working gas ($H_2$) can be replaced with inert gas ($N_2$).

Figure 1:
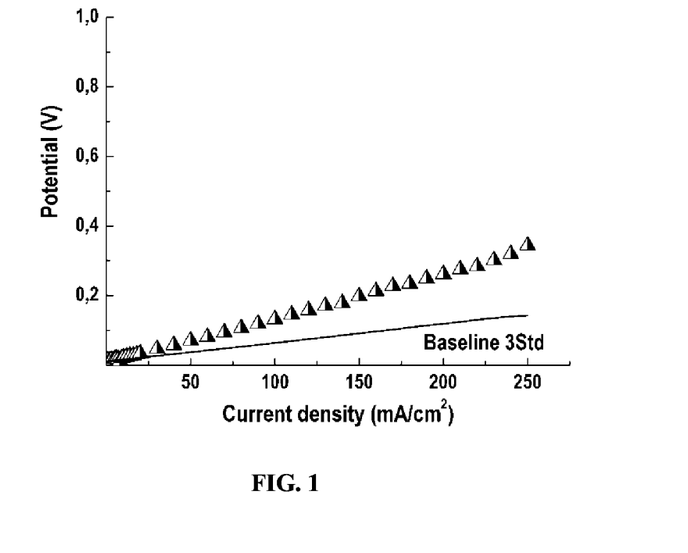
FIG. 1 shows a graph of current density vs. applied potential on a half cell test bench employing the electrocatalyst obtained in the Example 1 below.

FIG. 1 shows a VAC of an anode (surface area 10 $cm^2$) comprising the catalyst prepared as described above. The "Baseline" in FIG. 1 was obtained with an anode that contained 2.5% Pt and 2.5% Pd on 95% carbon (specific surface area about 1000 $m^2/g$; 90% of the carbon particles not larger than about 80 μm).

Example 2

2.1. Synthesis of Coprecipitated Ni—Pd—Mg Sample (18.05% Ni-1.5% Pd-0.45% Mg/80.0% C)

The procedure of Example 1 was repeated, except that the sample contained 18.05% Ni and 1.5% Pd instead of 17.05% Ni and 2.5% Pd. The addition rate of the reducing agent, compositions and concentrations corresponded to those set forth in Example 1.

The above-described procedure afforded 55.0 g 55.0 g of powder sample containing by weight 18.05% Ni. 1.5% Pd, 0.45% Mg and 80% carbon.

Figure 2:
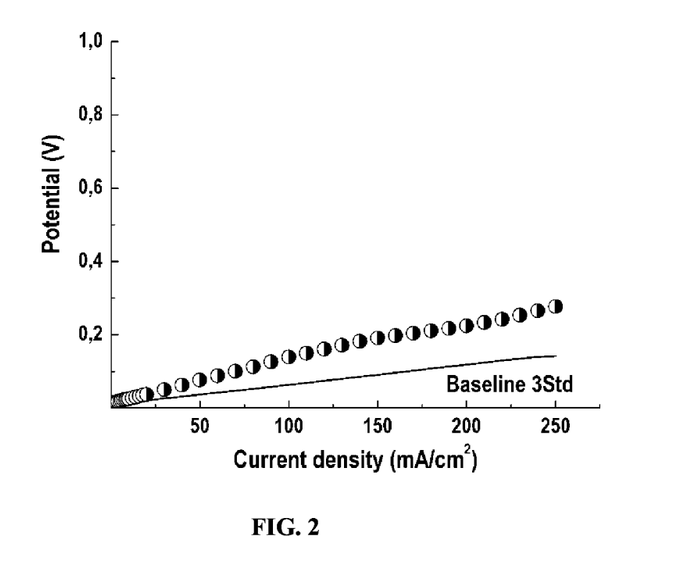
FIG. 2 shows a graph of current density vs. applied potential on a half cell test bench employing the electrocatalyst obtained in the Example 2 below.

2.2. Dry Reduction of Coprecipitated Ni—Pd—Mg Sample with 99.9% Hydrogen and Testing The reduction procedure set forth in Example 1 was repeated. An anode was prepared from the resultant catalyst and tested as set forth in Example 1. FIG. 2 shows a volt-ampere curve of the resultant anode. The "Baseline" in FIG. 2 was obtained as set forth in Example 1.

Example 3

Synthesis of Ni—Pd Catalyst (17.5% Ni-2.5% Pd/80.0% C) by Reduction with Hydrazine Solution A 35.44 g $NiCl_2.6H_2O$ was placed in a glass beaker and dissolved in 250 ml deionized water under vigorous stirring without heating until full dissolution.

Solution B 2.083 g $PdCl_2$ was placed in a 10 ml glass beaker and dissolved in 3.05 ml HCl (32%) using an automatic pipette followed by stirring at 80-90° C. for 40 min for complete dissolution.

Solutions A and B were mixed and diluted to 750 ml with deionized water and stirred for 3.5 h without heating (pH=2.0).

Solution C

Aqueous hydrazine ($N_2H_4.H_2O$) solution was used as reducing agent. The amount of hydrazine corresponded to a molar ratio $N_2H_4/(Ni^{2+}+Pd^{2+}) \geq$ about 4.5 to ensure complete reduction.

Solution D 250 g anhydrous $Na_2CO_3$ used as pH adjuster was placed in a glass beaker and dissolved in 1000 ml deionized water (concentration 250 g/l) under vigorous stirring and heating at 80-90° C. without boiling until full dissolution.

40.0 g carbon (same as employed in Example 1 above) was placed in a 10-liter reactor equipped with a stirrer, thermocouple, pH electrode and reflux condenser. The mixed Ni—Pd solution (Solutions A+B) was added to the reactor and the obtained suspension was stirred for 20 min without heating. Thereafter, $N_2H_4$ solution was introduced in the reactor using a dosimeter at a rate of about 25 ml/min, followed by the addition of $Na_2CO_3$ solution using a dosimeter at a rate of about 150 ml/min. The addition rate of the reducing agent must be controlled because at too low an addition rate, already formed metal particles may get oxidized by the oxygen dissolved in the mixture. Also, otherwise the resultant particle size may not be in the desired range. The temperature was increased to 96° C. under vigorous stirring. The pH during the reduction process was kept constant (10.0-12.0) by adding $Na_2CO_3$ solution. Upon completion of the reduction process, the resultant mixture was stirred at a temperature in the range 92-96° C. for ≤60 min, followed by a temperature decrease to 25° C. The obtained slurry was filtered and the filter cake was washed thoroughly with deionized water until the pH of the filtrate was about 6.0 and $Cl^-$ ions could no longer be detected. Then the solid was dried for 12-15 h hours in a vacuum furnace at 100° C. and placed in a desiccator. The catalyst thus obtained was sieved on a 75 μm mesh. The described procedure afforded 50.0 g of catalyst (17.5% Ni+2.5% Pd+80% C).

Figure 3:
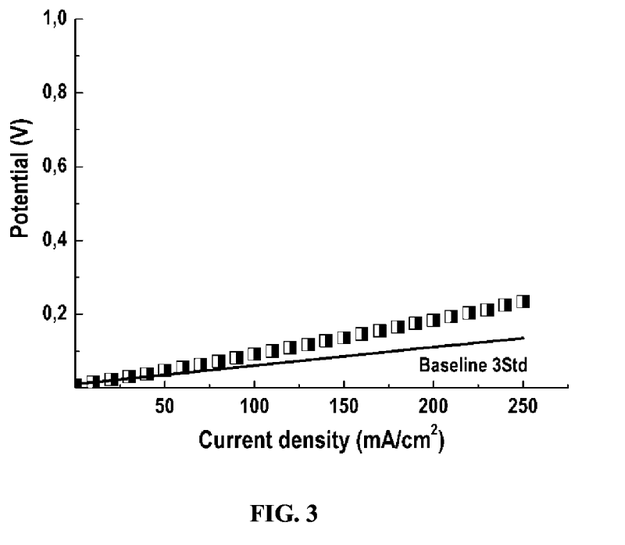
FIG. 3 shows a graph of current density vs. applied potential on a half cell test bench employing the electrocatalyst obtained in the Example 3 below.

An anode was prepared from the resultant catalyst and tested as described in Example 1. FIG. 3 shows a VAC of the resultant anode. The "Baseline" in FIG. 3 was obtained as set forth in Example 1.

Example 4

Synthesis of Ni—Pd Catalyst (17.5% Ni-2.5% Pd/80.0%) by Reduction with Hydrazine The procedure of Example 3 was repeated, except that the carbon employed as support was different (specific surface area about 1000 $m^2/g$; 90% of the carbon particles not larger than about 80 μm). The addition rate of the reducing agent, compositions and concentrations corresponded to those given in Example 3. The procedure afforded 50.0 g of catalyst (17.5% Ni+2.5% Pd+80% C).

Figure 4:
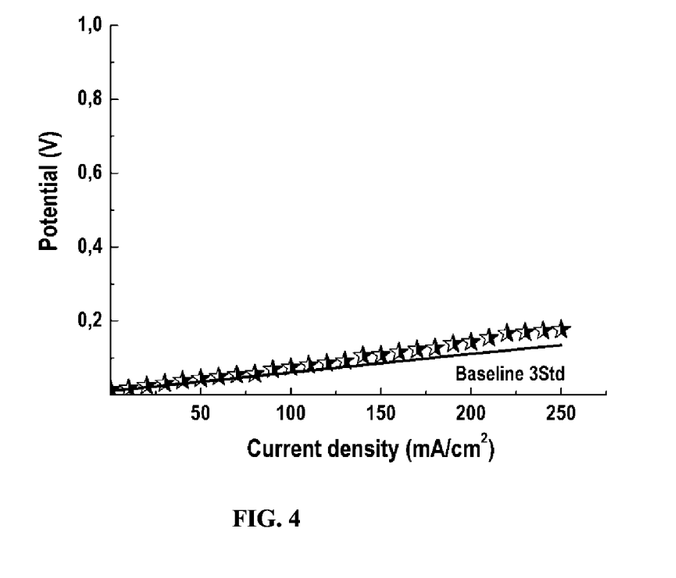
FIG. 4 shows a graph of current density vs. applied potential on a half cell test bench employing the electrocatalyst obtained in the Example 4 below.

An anode was prepared from the resultant catalyst and tested as set forth in Example 1. FIG. 4 shows a VAC of the resultant anode (regular procedure without preliminary reduction at 0.05 A). The "Baseline" in FIG. 4 was obtained as set forth in Example 1.

Example 5

Synthesis of Ni—Pd Catalyst (17.5% Ni-2.5% Pd/80.0% C) by Reduction with Hydrazine Solution A
466.44 g $NiCl_2.6H_2O$ was placed in a glass beaker and dissolved in 3500 ml of deionized water under vigorous stirring without heating until full dissolution.
Solution B
27.15 g $PdCl_2$ was placed in a glass beaker and dissolved in 40.0 ml HCl (32%), followed by stirring at 80-90° C. for 40 min for complete dissolution.

Solutions A and B were mixed, diluted to 4000 ml with deionized water and stirred for 3.5 h without heating (pH=2.0).
Solution C
Anhydrous $Na_2CO_3$ was placed in a glass beaker and dissolved in deionized water (concentration 250 g/l) under vigorous stirring and heating at 80-90° C. without boiling until full dissolution.
Solution D
Aqueous hydrazine ($N_2H_4.H_2O$) solution was used as reducing agent. The amount of hydrazine corresponded to a molar ratio of $N_2H_4/(Ni^{2+}+Pd^{2+})$≥about 4.5 to ensure complete reduction.

536.5 g carbon powder (the same as employed in Example 4 above) was placed in a 100-liter reactor equipped with stirrer, thermocouple, pH electrode and reflux condenser. The mixed Ni—Pd solution (Solutions A+B) was added to the reactor and the obtained suspension was stirred for 30 min without heating. The reduction was carried out as set forth in Example 3 above.

Upon completion of the reduction process, the resultant mixture was stirred at a temperature in the range 92-96° C. for ≤60 min, followed by a temperature decrease to 25° C. The obtained slurry was filtered and the filter cake was washed thoroughly with deionized water until the pH of the filtrate was about 6.0 and $Cl^-$ ions could no longer be detected. Then the solid was dried for 12-15 hours in a vacuum furnace at 100° C. and placed in a desiccator. The catalyst thus obtained was sieved on 75 μm mesh.

The catalyst weight after the completion of the above-described procedure was 650.0 g (17.5% Ni+2.5% Pd+80% C).

Figure 5:
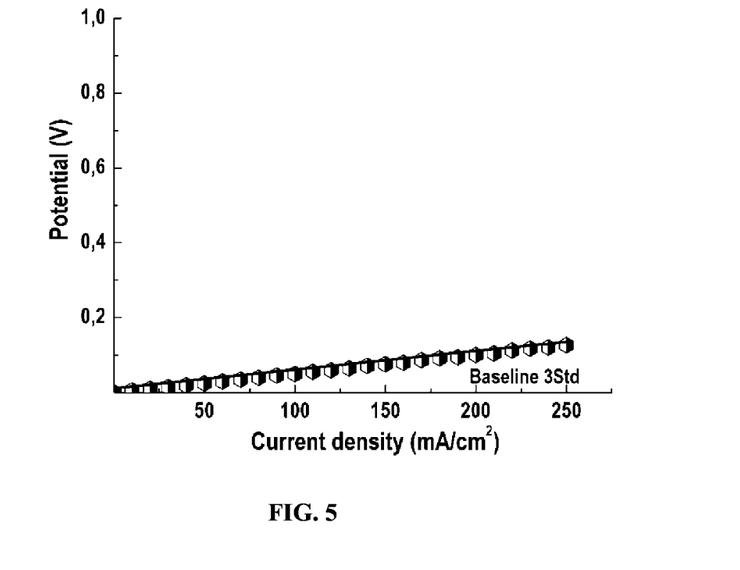
FIG. 5 shows a graph of current density vs. applied potential on a half cell test bench employing the electrocatalyst obtained in the Example 5 below.

An anode was prepared from the resultant catalyst and tested as set forth in Example 1. FIG. 5 shows a VAC of the resultant anode (regular procedure without preliminary reduction at 0.05 A). The "Baseline" in FIG. 5 was obtained as set forth in Example 1.

Example 6

6.1. Synthesis of Co-Precipitated Ni—Cr Sample (29.0% Ni-1.0% Cr/70.0% C)

Solution A
79.36 g $Ni(NO_3)_2.6H_2O$ and 3.81 g $Cr(NO_3)_3.9H_2O$ were placed in a glass beaker and dissolved in 500 ml with deionized water under vigorous stirring without heating until full dissolution (pH=5.5).
Solution B
100 g anhydrous $Na_2CO_3$ used as a precipitant was placed in a glass beaker and dissolved in 1000 ml deionized water (concentration 100 g/l) under vigorous stirring and heating at 80-90° C. without boiling until full dissolution.

38.51 g carbon (the same as employed in Example 1 above) was placed in a 3-liter reactor equipped with a stirrer, thermocouple and pH electrode. 900 ml of deionized water was added and the resultant mixture was stirred for 20 min. The temperature of the obtained suspension was increased to 60° C. Thereafter, the mixed Ni—Cr solution was co-precipitated with $Na_2CO_3$ solution at pH=9.05-9.5 and at a temperature of 60° C. under vigorous stirring. The solutions were introduced drop-wise and simultaneously using two dosimeters, namely Ni—Cr solution at a flow rate of about 10 ml/min and $Na_2CO_3$ solution at a flow rate of about 15 ml/min. After ageing for 60 min under the conditions described above, the resultant slurry was filtered and the filter cake was thoroughly washed with deionized water until the pH of the filtrate was about 6.0 and $NO_3^-$ ions could no longer be detected. The solid was dried in a vacuum oven at 100° C. for 12-15 h, affording 55.0 g of powder (29.0% Ni+1.0% Pd+70% carbon).

6.2. Dry Reduction of Co-Precipitated Ni—Cr Sample with 99.9% Hydrogen 25 g of the sample prepared as described above was divided into three crucibles and reduced separately in the tube furnace. The sample was purged under an Ar flow (flow rate 1.8 cc/sec) for 30 min. Thereafter, the temperature was increased to 400 or 450° C. at a rate of about 3° C./min under a $H_2$ flow (flow rate about 1.8 cc/sec). The reduction proceeded at 400 or 450° C. for 240 min. Upon completion of the reduction the reduced sample was cooled under a $H_2$ flow. After the temperature had decreased to 160° C. the $H_2$ flow was changed to an Ar flow and the cooling continued to 40° C. The reduced sample was taken out of the furnace and placed in a desiccator. The catalyst thus obtained was sieved on a 75 µm mesh.

Figure 6:
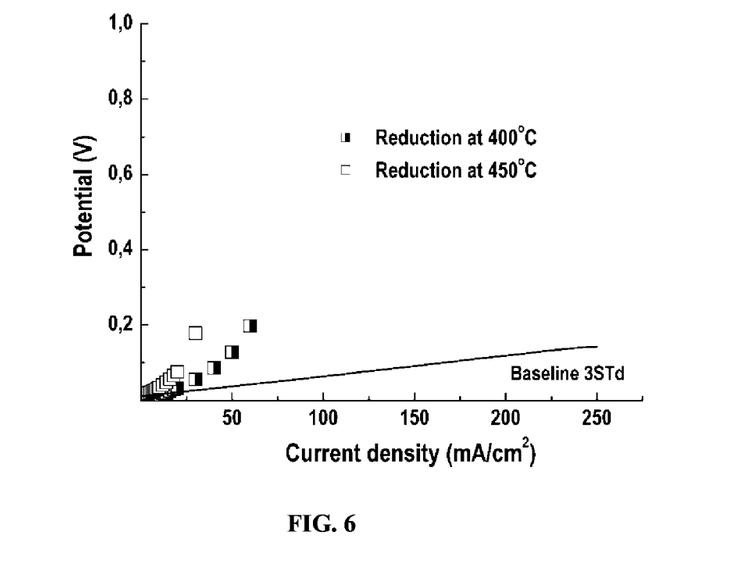
FIG. 6 shows a graph of current density vs. applied potential on a half cell test bench employing the electrocatalyst obtained in the Example 6 below.

An anode was prepared from the resultant catalyst and tested as set forth in Example 1. FIG. 6 shows a VAC of the resultant anode (reduction at current 0.05 A/cm$^2$ until E<0.015V, time limit 2 h). The "Baseline" in FIG. 6 was obtained as set forth in Example 1.

As can be seen from the results graphically represented in FIGS. 1-6, the nickel-based catalysts of the present invention provide anodes with properties which are close to or the same as those provided by anodes with a platinum-based catalyst. This affords significant cost savings without sacrificing required properties of the catalysts.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A catalyst for an anode of a fuel cell, wherein the catalyst comprises, in metallic form, (i) nickel, (ii) at least one transition metal and, optionally, (iii) at least one alkaline earth metal, supported on (iv) an electrically conductive carrier having a specific surface area of at least 50 m$^2$/g, a weight ratio (i):((ii)+(iii)) being at least 3:1, and wherein the catalyst is substantially free of any metal that is different from a transition metal and an alkaline earth metal.

2. The catalyst of claim 1, wherein (ii) consists of one or more of Pd, Cr, Co, Fe.

3. The catalyst of claim 1, wherein (ii) comprises Pd.

4. The catalyst of claim 1, wherein (iii) is present and comprises at least one of Ca and Mg.

5. The catalyst of claim 2, wherein (ii) contains at least Cr.

6. The catalyst of claim 1, wherein (iv) comprises activated carbon.

7. The catalyst of claim 1, wherein at least 50% of particles of (iv) have a size of not more than 30 µm.

8. The catalyst of claim 1, wherein particles of (i), (ii) and, optionally, (iii) supported on (iv) have a size of not more than 30 nm.

9. An anode for a fuel cell, wherein the anode comprises the catalyst of claim 1.

10. A fuel cell, wherein the fuel cell comprises the anode of claim 9.

11. A catalyst for an anode of a fuel cell, wherein the catalyst comprises, in metallic form, (i) nickel, (ii) at least one transition metal and, optionally, (iii) at least one alkaline earth metal, supported on (iv) an electrically conductive carrier having a specific surface area of at least 50 m$^2$/g, a weight ratio (i):((ii)+(iii)) being at least 3:1, and wherein the catalyst is obtained by a process which comprises (A) contacting a solution of (i) a nickel(II) compound, (ii) a compound of at least one transition metal and, optionally, (iii) a compound of at least one alkaline earth metal with a stoichiometric excess of reducing agent under basic conditions in the presence of (iv) the electrically conductive carrier; or (B) contacting a solution of (i) a nickel(II) compound, (ii) a compound of at least one transition metal and, optionally, (iii) a compound of at least one alkaline earth metal with an alkaline agent in the presence of (iv) the electrically conductive carrier to co-precipitate hydroxides and/or oxides of Ni, the at least one transition metal and, optionally, the at least one alkaline earth metal on (iv), filtering and drying resultant particles, followed by contacting the dried particles with reducing agent.

12. The catalyst of claim 11, wherein the catalyst is substantially free of any metal that is different from a transition metal and an alkaline earth metal.

13. The catalyst of claim 12, wherein (ii) consists of one or more of Pd, Cr, Co, Fe.

14. The catalyst of claim 11, wherein (ii) comprises Pd.

15. The catalyst of claim 13, wherein (ii) comprises Cr.

16. The catalyst of claim 13, wherein (iii) is present and comprises at least one of Ca and Mg.

17. The catalyst of claim 11, wherein (iv) comprises activated carbon.

18. The catalyst of claim 11, wherein particles of (i), (ii) and, optionally, (iii) supported on (iv) have a size of not more than 30 nm.

19. A fuel cell, wherein the fuel cell comprises an anode which comprises the catalyst of claim 11.

20. A catalyst for an anode of a fuel cell, wherein the catalyst comprises, in metallic form, (i) nickel, (ii) one or more transition metals which comprise palladium and, optionally, (iii) at least one alkaline earth metal, supported on (iv) an electrically conductive carrier having a specific surface area of at least 50 m$^2$/g, a weight ratio (i):((ii)+(iii)) being at least 3:1.

* * * * *